United States Patent
Turmell et al.

(10) Patent No.: US 6,406,372 B1
(45) Date of Patent: Jun. 18, 2002

(54) SYSTEM AND METHOD FOR TRANSFERRING USER-DEFINED INSTRUCTIONS BETWEEN A HOME VIDEO GAME AND AN ARCADE VIDEO GAME

(75) Inventors: Mark J. Turmell, Long Grove; John Kozmo Root, Chicago, both of IL (US)

(73) Assignee: Midway Games Inc., Chicago, IL (US)

( * ) Notice: Subject to any disclaimer, the term of this patent is extended or adjusted under 35 U.S.C. 154(b) by 0 days.

(21) Appl. No.: 09/135,598

(22) Filed: Aug. 18, 1998

(51) Int. Cl.[7] .............................. A63F 9/24; A63F 13/00
(52) U.S. Cl. ............................. 463/43; 463/44; 463/4; 463/1; 463/36
(58) Field of Search .................. 463/43, 44, 4, 463/1, 36

(56) References Cited

U.S. PATENT DOCUMENTS

| | | |
|---|---|---|
| 4,156,928 A | 5/1979 | Inose et al. |
| 4,342,454 A | 8/1982 | Baer et al. |
| 4,500,879 A | 2/1985 | Smith, III et al. |
| 4,575,622 A | 3/1986 | Pellegrini |
| 4,679,789 A | 7/1987 | Okada |
| 4,752,068 A | 6/1988 | Endo |
| 4,764,666 A | 8/1988 | Bergeron |
| 4,858,930 A | 8/1989 | Sato |
| 5,014,982 A | 5/1991 | Okada et al. |
| 5,078,399 A | 1/1992 | Lennon, Jr. |
| 5,114,155 A | 5/1992 | Tillery et al. |
| 5,179,517 A | 1/1993 | Sarbin et al. |
| 5,259,626 A | 11/1993 | Ho |
| 5,428,528 A | 6/1995 | Takenouchi et al. |
| 5,496,032 A | 3/1996 | Okada |
| 5,741,184 A | 4/1998 | Takemoto et al. |
| 5,759,100 A * | 6/1998 | Nakanishi .................. 463/37 X |
| 5,791,992 A * | 8/1998 | Crump et al. .................. 463/41 |
| 5,816,917 A * | 10/1998 | Kelmer et al. ............. 463/16 X |
| 5,885,156 A * | 3/1999 | Toyohara et al. ............ 463/1 X |
| 5,961,386 A * | 10/1999 | Sawaguchi ................ 463/43 X |
| 6,146,277 A * | 11/2000 | Ikeda ........................ 463/43 X |
| 6,165,071 A * | 12/2000 | Weiss ........................ 463/24 X |
| 6,183,367 B1 * | 2/2001 | Kaji et al. ................. 463/42 X |
| 6,234,902 B1 * | 5/2001 | Hazama ..................... 463/43 X |
| 6,246,558 B1 * | 7/2001 | Nishiumi et al. .......... 463/36 X |
| 6,302,792 B1 * | 10/2001 | Arai et al. ................. 463/23 X |

OTHER PUBLICATIONS

Abstract; Japanese Patent No. 09168667, entitled: "Television Game Machine," Published Jun. 30, 1997, 1 page.
Chown, T.; "Premier Manager 3," *Games Domain Review*, Apr. 1995, 5 pages.
"Save, Send, and Archive With the DexDrive," Online!, Jun. 19, 1998, 2 pages.

* cited by examiner

*Primary Examiner*—Valencia Martin-Wallace
*Assistant Examiner*—Chanda Harris
(74) *Attorney, Agent, or Firm*—Jenkens & Gilchrist (57) ABSTRACT

A system and method for transferring user-defined instructions between a home video game and a corresponding arcade video game comprises the home video game, the arcade video game, and a memory device. The home and arcade video games each include a control unit, a user controller, and a display. The user controller and the display are connected to the control unit. The control unit executes a game program to create a visual representation on the display. The user controller is operated by a user to cause the control unit to vary the visual representation on the display. The memory device is capable of being connected to the control unit of each of the home and arcade video games. To transfer the user-defined instructions between the home and arcade video games, the memory device is first connected to the control unit of one of the home and arcade video games. Next, the user controller of the one of the home and arcade video games is operated by the user to create the user-defined instructions and to cause the associated control unit to load the user-defined instructions into the memory device. Finally, the memory device is connected to the other of the home and arcade video games so that the user-defined instructions can be loaded therein and used during game play.

41 Claims, 6 Drawing Sheets

SYSTEM AND METHOD FOR TRANSFERRING USER-DEFINED INSTRUCTIONS BETWEEN A HOME VIDEO GAME AND AN ARCADE VIDEO GAME

FIELD OF THE INVENTION

The present invention relates generally to video games and, more particularly, relates to a system and method for transferring user-defined instructions between a home video game and an arcade (coin-operated) video game.

BACKGROUND OF THE INVENTION

Many video games include a home version and an arcade version. Heretofore, a barrier has essentially existed between the home video game and corresponding arcade video game. While a player could play both the home and arcade video games, the games themselves have largely remained separate from each other.

In an attempt to bridge the barrier between home and arcade video games, U.S. Pat. No. 4,858,930 to Sato proposes a game system comprising a home video game and a commercial video game. The home game is played and the ability of a character which appears in the game is calculated and set with the progress of the game. The ability of the character calculated and set in the home video game is input to a corresponding commercial video game as the initial ability data of the character which appears in the commercial game. If the video game is a role playing game, the character ability of a hero in the role playing game can consist of power traits such as physical strength, intellect, life force, and agility and non-power items such as experience points, personal effects, and money for buying personal effects. If the video game is a simulation game such as baseball, the character ability of a baseball player in the baseball game can consist of batting average, defensive power, running power, fatigue degree, pitching power, etc. If the video game is a driving game, the character ability of a racing car in the driving game can consist of the car's body, suspension, steering wheel, engine, tire, fuel tank capacity, etc.

A drawback of the Sato patent is that it merely proposes the transfer of character ability data between the home video game and the corresponding arcade video game. The transfer of such a limited amount of information between the home and arcade games provides only a minimally useful link between the home and arcade games. A need therefore exists for a system and method for transferring more than just character ability data between home and arcade video games.

SUMMARY OF THE INVENTION

To that end, the present invention provides a system and method for transferring user-defined instructions between a home video game and a corresponding arcade (coin-operated) video game. The home video game includes a home game control unit, a home game user controller, and a home game display. The home game user controller and the home game display are connected to the home game control unit. The home game control unit executes a home game program to create a visual representation on the home game 11 display. The home game user controller is operated by a home game user to cause the home game control unit to vary the visual representation on the home game display. Likewise, the arcade video game includes an arcade game control unit, an arcade game user controller, and an arcade game display. The arcade game user controller and the arcade game display are connected to the arcade game control unit. The arcade game control unit executes an arcade game program to create a visual representation on the arcade game display. The arcade game user controller is operated by an arcade game user to cause the arcade game control unit to vary the visual representation on the arcade game display.

To allow for the transfer of user-defined instructions between the home and arcade video games, there is provided a memory device capable of being connected to both the home game control unit and the arcade game control unit. The memory device is preferably in the form of a memory cartridge, memory card, or floppy/hard disk adapted to be inserted into connectors provided by the home and arcade video games. To transfer the user-defined instructions from the home video game to the arcade video game, the memory device is first connected to the home game control unit. Then, the home game user operates the home game user controller to enter the user-defined instructions into the home game control unit and to cause the home game control unit to load the user-defined instructions into the memory device. In the case of a sports game such as football involving plays in which video players line up in a predefined formation and then run predefined routes out of that formation after the football is snapped, the user-defined instructions may include a user-defined sports play directing the positioning and movement of the video players. The memory device can then be taken to and connected to the arcade game control unit. The arcade game user operates the arcade game user controller to cause the arcade game control unit to load the user-defined instructions from the memory device. The arcade game user can then employ the user-defined instructions in the play of the arcade video game. It is contemplated that user-defined instructions may be transferred from the arcade video game to the corresponding home video game in the same manner as such instructions are transferred from the home video game to the arcade video game.

The above summary of the present invention is not intended to represent each embodiment, or every aspect of the present invention. This is the purpose of the figures and detailed description which follow.

BRIEF DESCRIPTION OF THE DRAWINGS

Other objects and advantages of the invention will become apparent upon reading the following detailed description and upon reference to the drawings in which.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DESCRIPTION OF ILLUSTRATIVE EMBODIMENTS

Figure 1:
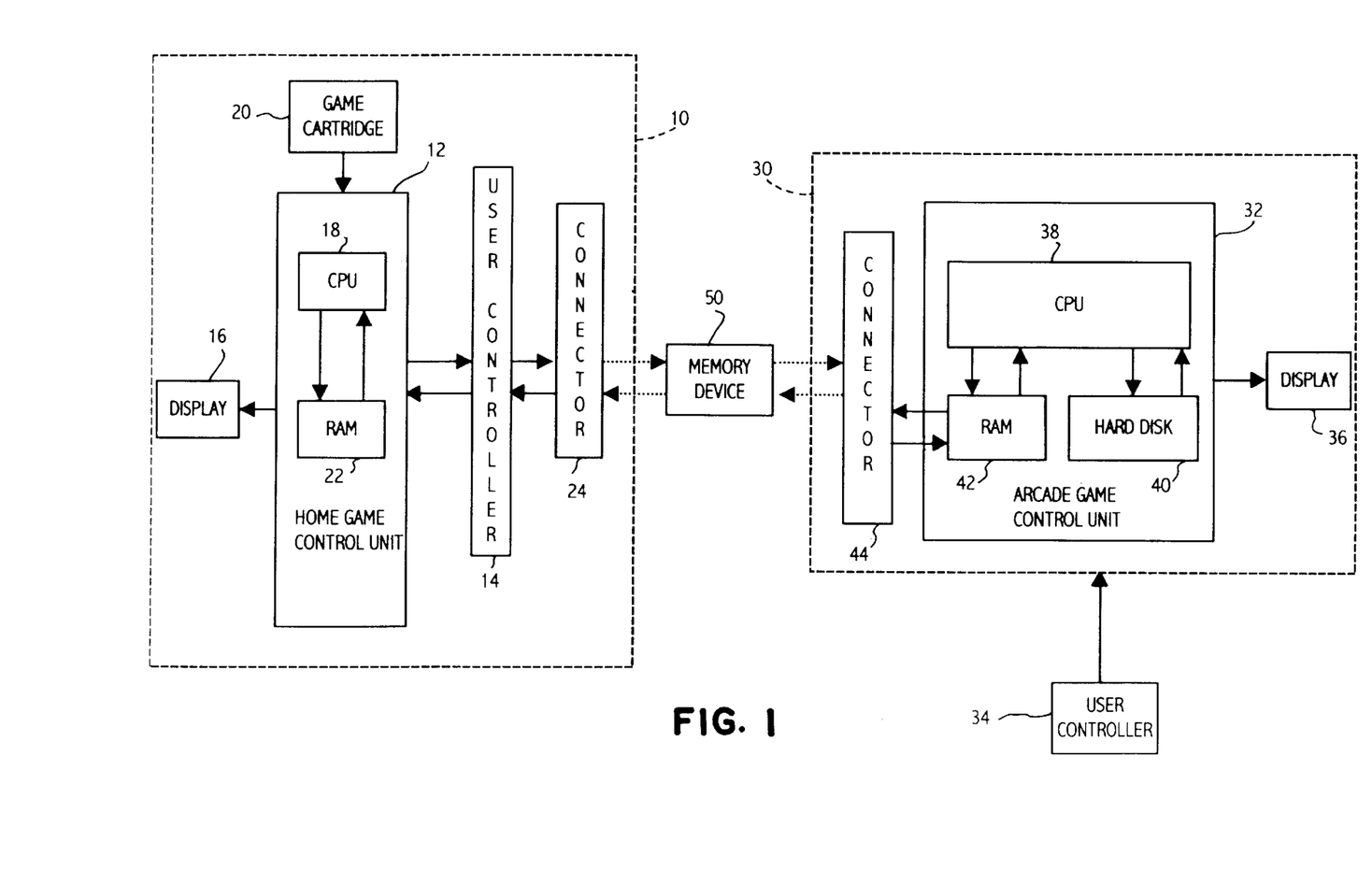
FIG. 1 is a block diagram of a system for transferring user-defined instructions between a home video game and a corresponding arcade video game.

Turning now to the drawings, FIG. 1 is a block diagram of a system for transferring user-defined instructions between a home video game 10 and a corresponding arcade (coin-operated) video game 30 in accordance with the present invention. The home video game 10 includes a control unit 12, a user controller 14, and a display 16. The display 16 is typically a television set provided by a user. The user controller 14 and the display 16 are connected to the control unit 12. A central processing unit 18 in the control unit 12 executes a home game program stored on a game cartridge 20 to create a visual representation on the display 16. As discussed below, the central processing unit 18 may also execute user-defined instructions stored in a random access memory 22. During game play, the user controller 14 is operated by a user to cause the control unit 12 to vary the visual representation on the display 16.

Likewise, the arcade video game 30 includes a control unit 32, a user controller 34, and a display 36. Unlike the home game display 16, the arcade game display 36 is not provided by the user, but rather is housed in the same arcade game cabinet as the control unit 32 and the user controller 34. Within this cabinet, the user controller 34 and the display 36 are connected to the control unit 32. A central processing unit 38 in the control unit 32 executes an arcade game program stored on a hard disk 40 to create a visual representation on the display 36. As discussed below, the central processing unit 38 may also execute user-defined instructions stored in a random access memory 42. During game play, the user controller 34 is operated by a user to cause the control unit 32 to vary the visual representation on the display 36.

To allow for the transfer of user-defined instructions between the home video game 10 and the corresponding arcade video game 30, there is provided a portable read/write memory device 50 capable of being connected to either the home game control unit 12 or the arcade game control unit 32. The memory device 50 is connected to the home game control unit 12 via a connector 24. Depending upon the equipment used to implement the home video game in FIG. 1, the connector 24 may be indirectly connected to the control unit 12 via the user controller 14 as illustrated in FIG. 1 or may alternatively be directly connected to the control unit 12.

In one preferred embodiment, the present invention is limited to the transfer of user-defined instructions from the home video game 10 and the arcade video game 30. To carry out this transfer, the memory device 50 is first connected to the home game control unit 12. Next, the user operates the associated user controller 14 to enter the user-defined instructions into the control unit 12 and to cause the control unit 12 to load the user-defined instructions into the memory device 50. The memory device 50 can then be disengaged from the control unit 12, carried to the arcade, and connected via connector 44 to the control unit 32 of the corresponding arcade game 30. The user operates the user controller 34 to cause the control unit 32 to load the user-defined instructions from the memory device 50 into the random access memory 42. The user can then employ the user-defined instructions in the play of the arcade video game 30.

In another embodiment, user-defined instructions can be transferred from the arcade video game 30 to the home video game 10. The drawings reflect this possibility of transferring user-defined instructions from the arcade video game 30 to the home video game 10. To carry out this transfer, the memory device 50 is first connected to the arcade game control unit 32. Next, the user operates the associated user controller 34 to enter the user-defined instructions into the control unit 32 and to cause the control unit 32 to load the user-defined instructions into the memory device 50. The memory device 50 can then be disengaged from the control unit 32, carried home, and connected via connector 24 to the control unit 12 of the corresponding home game 10. The user operates the user controller 14 to cause the control unit 12 to load the user-defined instructions from the memory device 50 into the random access memory 22. The user can then employ the user-defined instructions in the play of the home video game 10.

Figure 2:
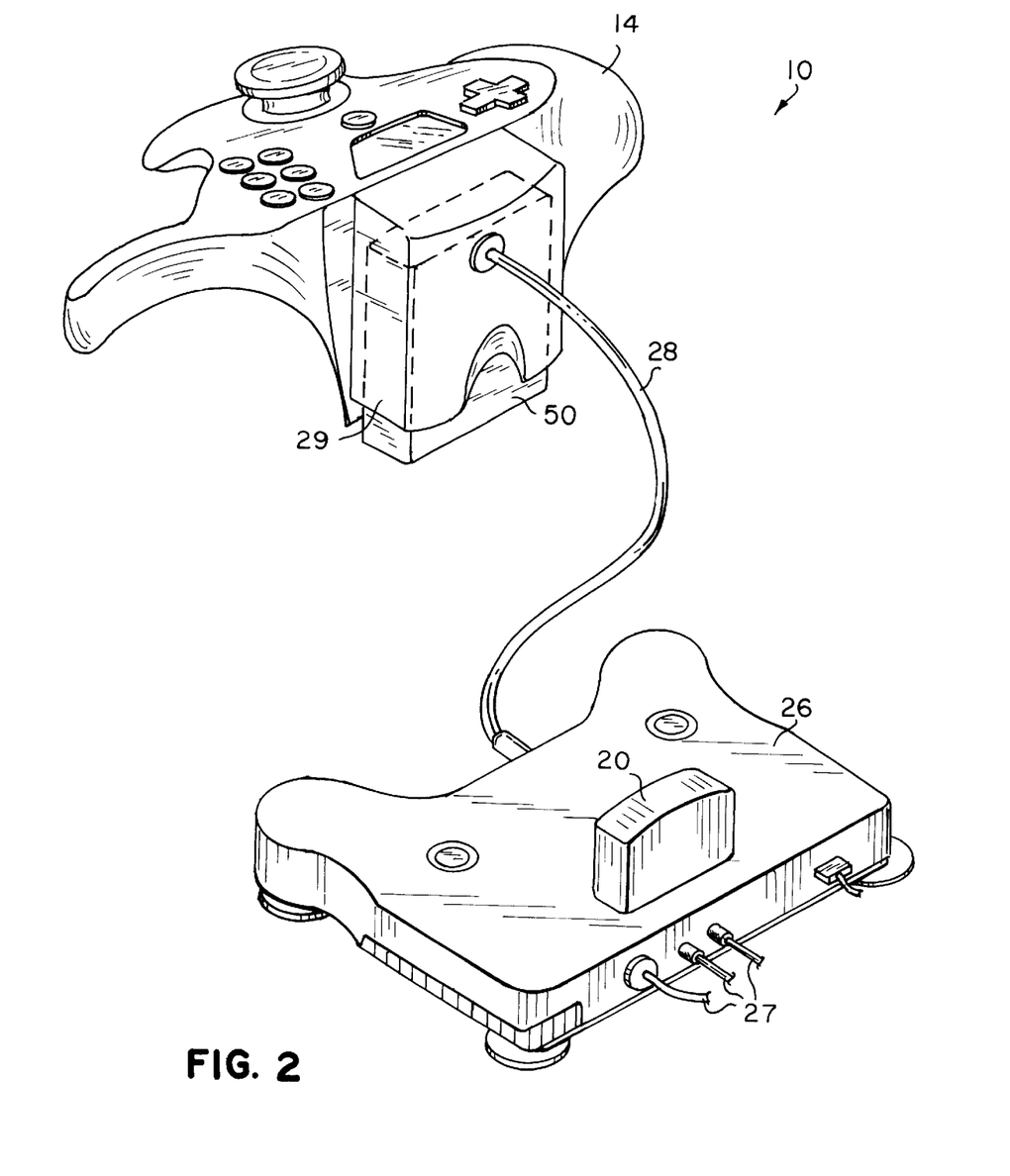
FIG. 2 is an isometric view of a typical home video game capable of receiving a memory cartridge.

FIG. 2 depicts an example of a home game 10 commercially available from Nintendo Company Limited of Kyoto, Japan. The display 16 is provided by a user and, therefore, is not shown in the figure. The control unit 12, including the central processing unit 18 and the random access memory 22, is housed within a game console 26. The display 16 (see FIG. 1) is connected to the game console 26 by audio and video cords 27. The game cartridge 20 is engaged to a standard edge connector (not shown) mounted within the game console 26. The user controller 14 is in the form of a hand-held controller connected to the game console 26 by a cord 28. The memory device 50 is preferably in the form of a memory cartridge, memory card, or floppy/hard disk adapted to be inserted into a socket 29 containing the edge connector 24. Although the connector 24 is illustrated as being contained within the hand-held controller 14, the connector 24 may alternatively be contained within the game console 26 so that the memory device 50 can be mounted to the game console 26 in a manner similar to the game cartridge 20. Using either mounting scheme, the memory device 50 is connected to the control unit 12 housed within the game console 26.

Figure 3:
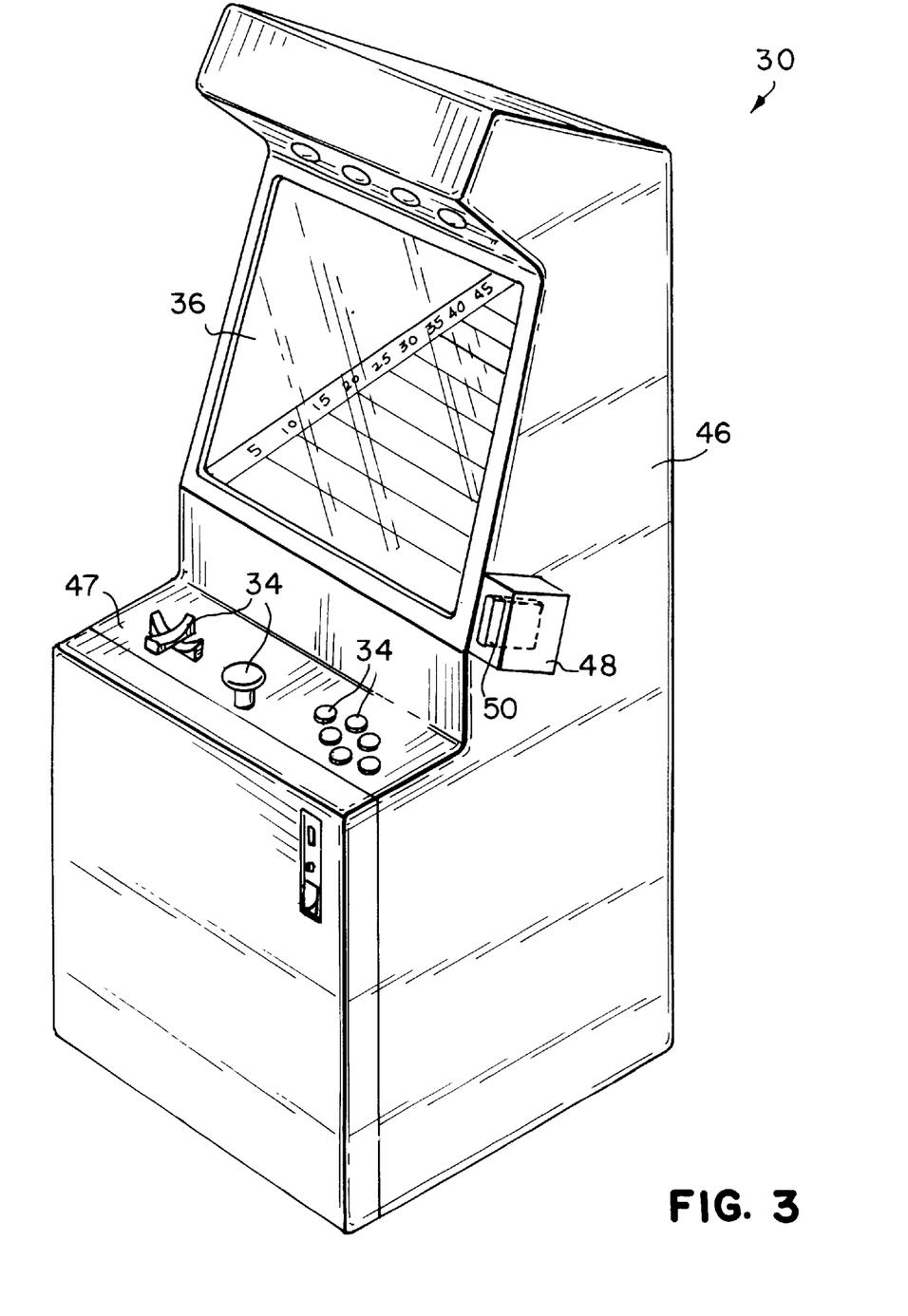
FIG. 3 is an isometric view of an arcade video game capable of receiving a memory cartridge.

FIG. 3 depicts the arcade (coin-operated) video game 30 corresponding to the home game 10. The control unit 32, including the central processing unit 38, the hard disk 40, and the random access memory 42, and the display 36 are housed within a game cabinet 46. The user controller 34 is in the form of buttons, joysticks, and the like mounted to a table-like surface 47 of the cabinet 46. The memory device 50 is adapted to be inserted into a connection device 48 mounted to a side of the cabinet 46. The connection device 48 forms a socket containing the connector 44 (not shown).

Figure 4:
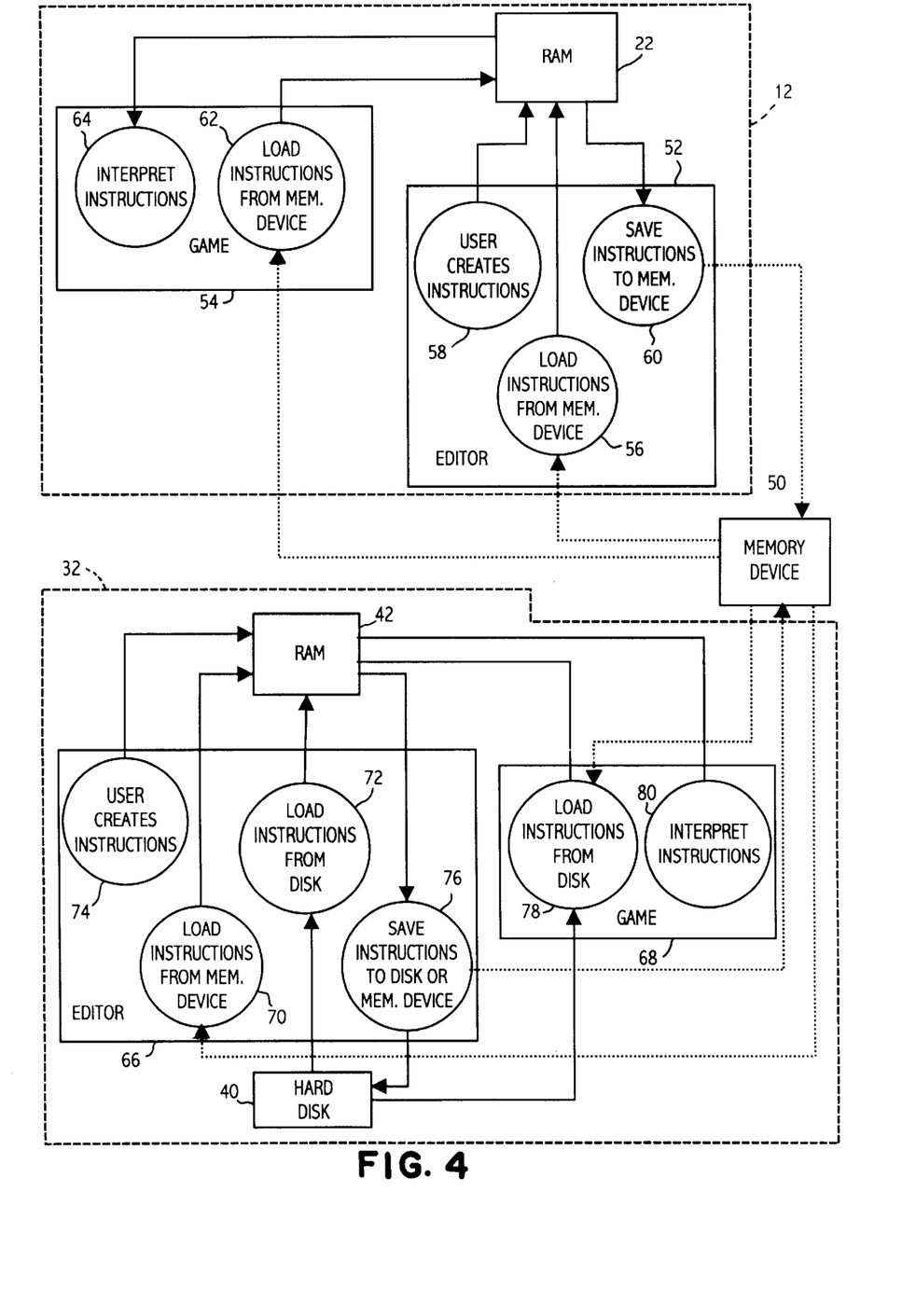
FIG. 4 is a detailed block diagram of the functions performed by the control units of the respective home and arcade video games in FIG. 1 in accordance with the present invention.

The system and method of the present invention are described in greater detail below in connection with FIGS. 4, 5, and 6. Referring first to FIG. 4, there is shown a detailed block diagram showing the functions performed by the control units 12 and 32 of the respective home and arcade video games 10 and 30 in accordance with the present invention. When the memory device 50 is connected to the control unit 12 of the home video game, the control unit 12 employs the memory device 50 to perform both "editor" functions 52 and "game" functions 54. When the game cartridge is initially activated, the control unit 12 generates a menu on the display 16 allowing a user to select "editor" functions 52 or "game" functions 54.

The "editor" functions 52 of the home game control unit 12 include (1) a loading function 56 in which any user-defined instructions previously stored on the memory device 50 are loaded into the random access memory 22 prior to playing the game so that these user-defined instructions are available for use during game play, (2) a creation function 58 in which a user creates instructions for storage in the random access memory 22 prior to playing the game so that these user-defined instructions can be used during game play, and (3) a saving function 60 in which any user-defined instructions stored in the random access memory 22 are saved to the memory device 50 so that the instructions can be used at some future time in the home game or can be used in the corresponding arcade game by carrying the memory device 50 to the arcade game and loading the instructions from the memory device 50 into the random access memory 42 of the arcade game control unit 32. The user may be required to enter a password (e.g., name and personal identification number) to initiate the loading function 56 so that only those instructions created by that user, and not other users, are available for use during game play.

The "game" functions 54 of the home game control unit 12 include (1) a loading function 62 in which user-defined instructions previously stored in the memory device 50 are loaded into the random access memory 22 just prior to playing the game so that these user-defined instructions are available for use during game play, and (2) an interpreting function 64 in which a user selects user-defined instructions in the random access memory 22 for execution by the control unit 12 during game play. The user may be required to enter a password to initiate the loading function 62.

When the memory device 50 is connected to the control unit 32 of the arcade video game, the control unit 32 employs the memory device 50 to perform both "editor" functions 66 and "game" functions 68. When the arcade game is activated by placing an appropriate amount of money in the coin acceptor and pressing a "start" button on the game's user controller, the control unit 32 generates a menu on the display 36 allowing a user to select "editor" functions 66 or "game" functions 68. These "editor" and "game" functions 66 and 68 are similar to those of the home video game, except that user-defined instructions can be loaded from and saved to the hard disk 40.

In particular, the "editor" functions 66 of the arcade game control unit 32 include (1) loading functions 70 and 72 in which any user-defined instructions previously stored on the memory device 50 or the hard disk 40 are loaded into the random access memory 42 prior to playing the game so that these user-defined instructions are available for use during game play, (2) a creation function 74 in which a user creates instructions for storage in the random access memory 42 prior to playing the game so that these user-defined instructions can be used during game play, and (3) a saving function 76 in which any user-defined instructions stored in the random access memory 42 are saved to the hard disk 40 so that the instructions can be used at some future time in the arcade game. In one preferred embodiment, the saving function 76 is limited to saving the user-defined instructions to the hard disk 40. However, in an alternative embodiment contemplated in FIG. 4, the saving function 76 can also save the user-defined instructions to the memory device 50 so that the instructions can be used in the corresponding home game by carrying the memory device 50 to the home game and loading the instructions from the memory device 50 into the random access memory 22 of the home game control unit 12. The user may be required to enter a password to initiate the loading functions 70 and 72.

The "game" functions 68 of the game control unit 32 include (1) a loading function 78 in which user-defined instructions previously stored on the hard disk 40 or the memory device are loaded into the random access memory 42 just prior to playing the game so that these user-defined instructions are available for use during game play, and (2) an interpreting function 80 in which a user selects user-defined instructions in the random access memory 42 for execution by the control unit 32 during game play. The user may be required to enter a password to initiate the loading function 78.

The present invention is described below in the context of a video football game involving plays in which video football players line up in a predefined formation and then run predefined routes out of that formation after the football is snapped. In this context, the user-defined instructions may include football plays directing the initial positioning and subsequent movement of the video football players. In connection with these football plays, the control units 12 and 32 of the respective home and arcade games can perform all the functions specified in FIG. 4. For example, a user can create the football play in either the home game or the arcade game using their respective creation functions 58 and 74 (FIG. 4), incorporate the football play into the playbook provided by the game so that the user-defined football play can be selected and executed during game play using the interpret functions 64 and 80, and save the football play to the memory device 50 using the saving function 60 so that the football play can be transferred from the home game to the arcade game and incorporated in the playbook of both the home and arcade games. If the system allows the saving function 76 in FIG. 4 to save to the memory device 50 in addition to the hard disk, then the football play can also be transferred from the arcade game to the home game.

Figure 5:
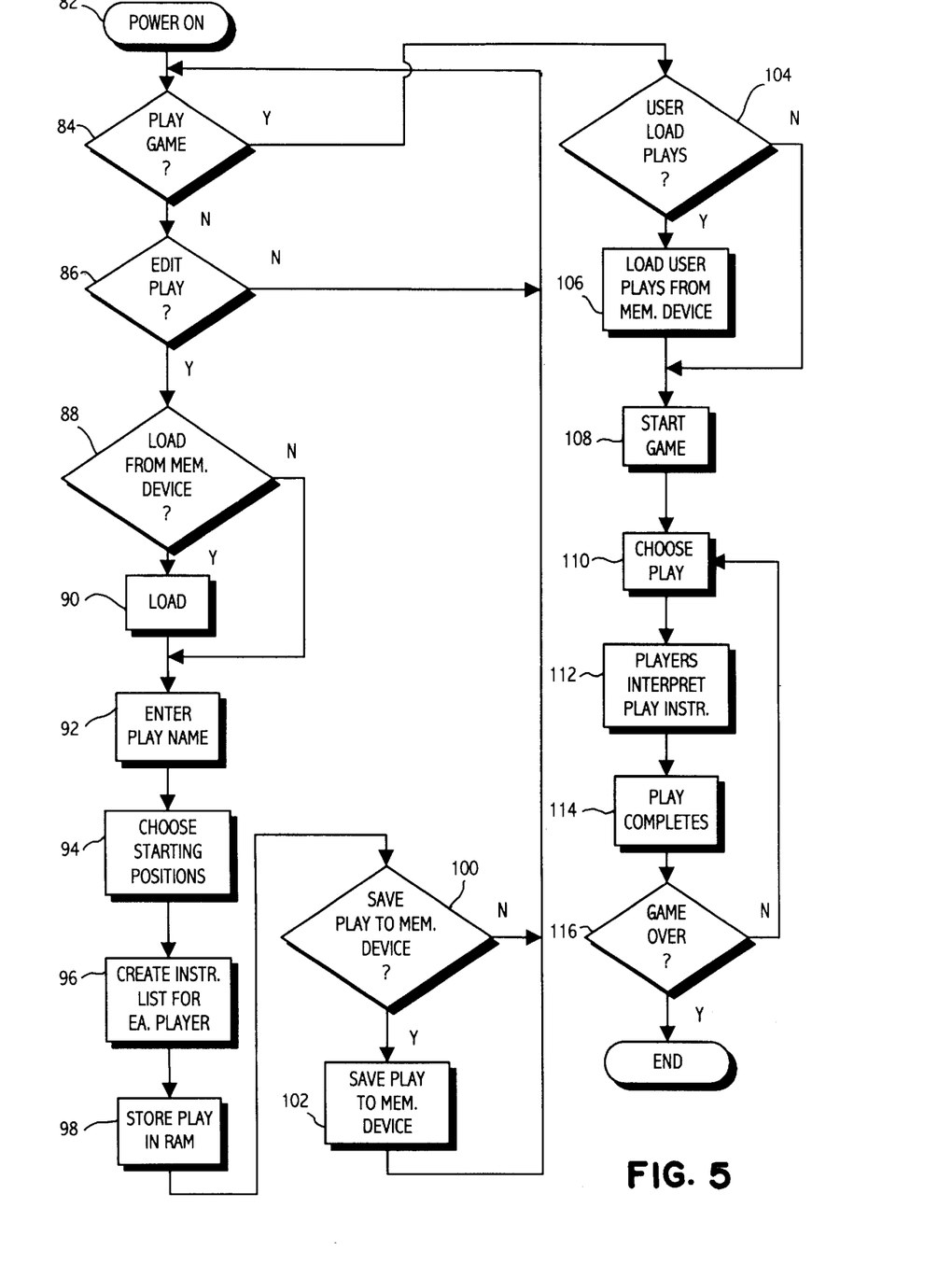
FIG. 5 is a flow chart showing a method of operating a home or arcade video football game employing user-defined instructions in the form of football plays.

FIG. 5 is a flow chart showing a method of operating a home or arcade video football game employing user-defined instructions in the form of football plays. After the video game is activated at step 82, the video game provides the user with options of beginning play or editing football plays at steps 84 and 86. These options can be presented to the user by a main menu shown on the display. If the user does not begin game play at step 84 and selects the editing option at step 86, the video game provides the user with the option of loading football plays from the memory device 50 into the game's random access memory at steps 88 and 90. In the case of the arcade game, football plays can be loaded from the hard disk as well. This entails the control unit loading functions 56, 70, and 72 described above in connection with FIG. 4. Next, the user can create a football play with the aid of a "play editor" screen shown on the game display and depicted in FIG. 6. This entails the creation functions 58 and 74 in FIG. 4.

Figure 6:
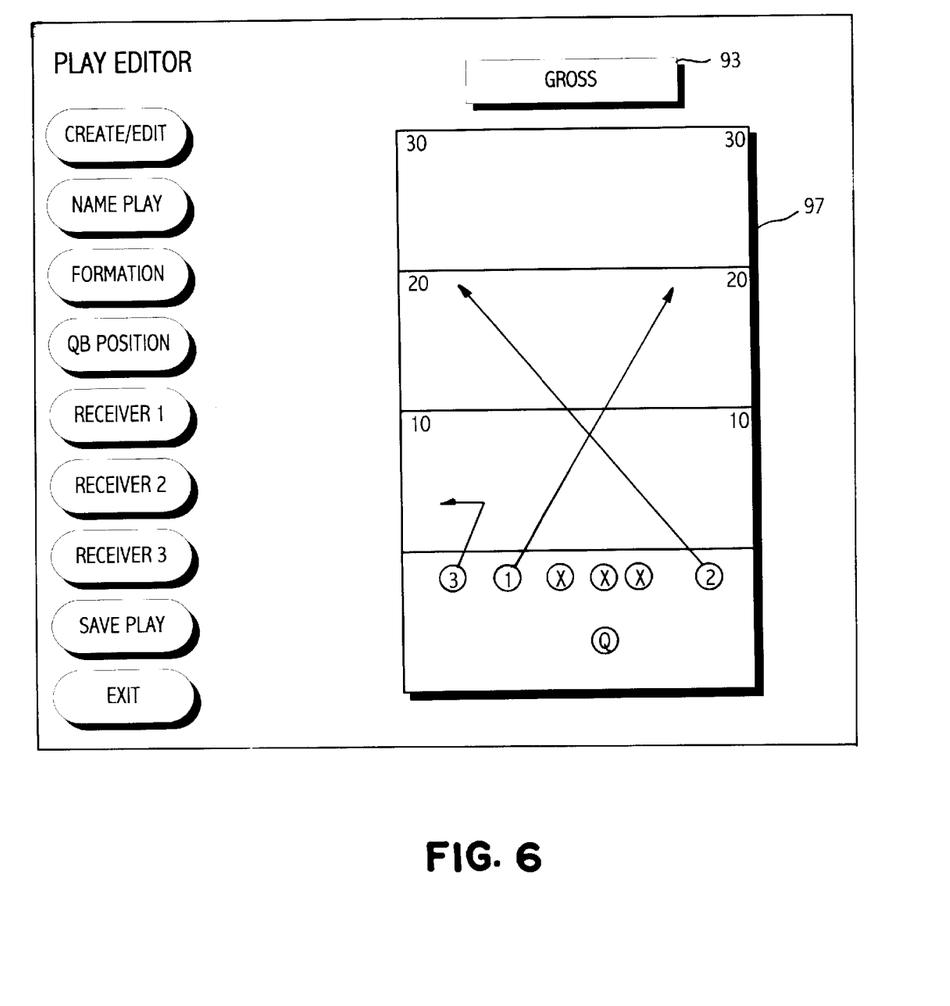
FIG. 6 is a "play editor" screen shown on the display of the video football game from which a game user can begin to create football plays and ultimately store these football plays in both the video game's memory and the portable memory device.

Referring to FIGS. 5 and 6, to create a football play, the user first selects the menu button "create/edit" in FIG. 6 to view vacant (unused) slots in the playbook for user-defined football plays and then chooses a slot. Second, the user selects the menu button "name play" in FIG. 6 and enters a play name such as "cross" at step 92. In FIG. 6, the play name "CROSS" appears in a play name field 93. Third, at steps 94 and 96, the user successively selects the menu buttons "formation," "QB position," "receiver 1," "receiver 2," and "receiver 3," in FIG. 6 and selects the formation and starting positions of the video football players prior to snapping the football. The quarterback, for example, can be set in a regular position immediately behind the center or can be set in a shotgun position as shown in FIG. 6. The receivers can be placed in traditional receiver positions at the line of scrimmage as shown in FIG. 6 or behind the quarterback in a runningback position. The user also defines the routes or patterns run by the video football players after the football is snapped. For example, in FIG. 6 two of the receivers are running a "crossing" pattern while the third receiver is running a short "out" pattern. The "play editor" screen in FIG. 6 includes a schematic representation 97 of a portion of a football field to aid the user in creating the football play. Defining the formation, starting positions, and routes of the video football players effectively creates an instruction list to be followed by each player when the football play is selected and executed during game play.

After creating a football play, the football play is stored in the game's random access memory at step 98. At steps 100 and 102, the user has the option of saving the football play to the memory device 50 if it is connected to the home video game and, in the case of the arcade game, to the hard disk as well. This entails the control unit functions 60 and 76 in FIG. 4. Moreover, in an alternative embodiment, the user has the option of saving the football play to the memory device 50 if it is connected to the arcade video game. The user may create and store additional football plays in the manner described above.

Once the user decides to initiate game play at step 84, at steps 104 and 106 the video game provides the user with the option of loading football plays into random access memory from the memory device 50 and, in the case of the arcade game, from the hard disk as well. This entails the loading functions 62 and 78 in FIG. 4. Next, the football game starts at step 108. During the football game, the user selects plays at step 110. If any user-defined plays are stored in random access memory, these plays are available for selection by the user. In response to play selection, the video game executes the football play at step 112 until the play is completed at step 114. With respect to any user-defined football plays, the video football players interpret the instructions directing their starting positions and subsequent movements. This entails the interpreting functions 64 and 80 in FIG. 4. Steps 110, 112, and 114 are repeated until the game is over at step 116.

While the present invention has been described with reference to one or more particular embodiments, those skilled in the art will recognize that many changes may be made thereto without departing from the spirit and scope of the present invention. For example, instead of using the portable memory device 50, passwords can be used to transfer user-defined instructions such a sports plays between the home game 10 and the arcade game 30. Such a system appears like the system in FIG. 1, except that the memory device 50 and connectors 24 and 44 are missing. To accomplish the transfer of user-defined instructions without these elements, the user-defined instructions are encoded as a string of ascii characters (i.e., a password), where each possible user-defined instruction created by a user has a unique character string associated therewith. The control units 12 and 32 of the respective home and arcade video games 10 and 30 each include a decoding function that allows the control unit to decode a character string and thereby recognize the user-defined instructions associated therewith. To transfer user-defined defined instructions from the home game 10 to the arcade game 30, a user creates instructions on the home game 10 and the control unit 12 informs the user via the display 16 as to the password associated with the user-defined instructions. To load the user-defined instructions into the arcade game 30, the user enters the password into the arcade game 30. The control unit 32 of the arcade game 30 then decodes the password and loads the instructions associated with the password into the game's memory. It is contemplated that user-defined instructions can be transferred from the arcade game 30 to the home game 10 in a similar manner.

Each of these embodiments and obvious variations thereof is contemplated as falling within the spirit and scope of the claimed invention, which is set forth in the following claims.

What is claimed is:

1. A system for transferring user-defined instructions between a home video game and a corresponding arcade video game, comprising:

a portable memory device for storing user-defined instructions; and the home video game and the arcade video game each including a control unit, a user controller, a display, random access memory and a connector, the user controller and the display being connected to the control unit, the control unit executing a game program to create a visual representation on the display, the game program of one of the home and arcade video games providing a setup mode and a play mode, the video game being played during the play mode but not during the setup mode, the user controller being operated by a user to cause the control unit to vary the visual representation on the display, the connector being accessible to the user and coupled to the control unit, the connector being adapted to connect to the memory device;

wherein to transfer the user-defined instructions between the home video game and the arcade video game, the memory device is first connected to the connector of one of the home and arcade video game connectors, the user controller of the one of the home and arcade video games is operated by the user during the setup mode to create the user-defined instructions prior to playing the game and to cause the associated control unit to load the user-defined instructions into the memory device, and the memory device is connected to the connector of the other of the home and arcade video games, such that the user-defined instructions may be transferred to and stored in said random access memory of the other of the home and arcade video games.

2. The system of claim 1, wherein the user controller of the other of the home and arcade video games is operated by the user to cause the associated control unit to execute the user-defined instructions during play of the other of the home and arcade video games.

3. The system of claim 1, wherein the arcade video game includes a cabinet containing the associated control unit and the associated display and supporting the associated user controller, the connector of the arcade video game being mounted to a side of the cabinet.

4. The system of claim 1, wherein the memory device is selected from a group consisting of a memory card, a memory cartridge, a floppy disk, and a hard disk.

5. The system of claim 1, wherein after the memory device is connected to the connector of the other of the home and arcade video games, the user controller of the other of the home and arcade video games is operated by the user to cause the associated control unit to load the user-defined instructions from the memory device into the associated control unit, thereby allowing the associated control unit to execute the user-defined instructions during game play.

6. The system of claim 1, wherein the user-defined instructions direct positioning and movement of video characters appearing in the home and arcade video games.

7. The system of claim 1, wherein the home and arcade video games are a sports game, the user-defined instructions including a sports play directing positioning and movement of video sports players.

8. The system of claim 7, wherein the sports play is a football play and the video sports players are video football players, the user-defined football play defining a formation and starting positions of the video football players prior to a snap of a video football, the user-defined football play defining routes run by the video football players out of the formation after the video football is snapped.

9. A system for transferring user-defined instructions between a home video game and a corresponding arcade video game, the home video game and the arcade video game each including a control unit, a user controller, random access memory, and a display, the user controller and the display being connected to the control unit, the control unit executing a game program to create a visual representation on the display, the game program of one of the borne and arcade video games providing a setup mode and a play mode, the video game being played during the play mode but not during the setup mode, the user controller being operated by a user to cause the control unit to vary the visual representation on the display, the system comprising:

portable storage means for storing the user-defined instructions created by the user prior to playing the game during the setup mode by operating the user controller of one of the home and arcade video games, said portable storage means delivering said user-defined instructions to the random access memory of the other of the home and arcade video games;

first connector means, located at the home video game and accessible to the user, for connecting the storage means to the control unit of the home video game; and     second connector means, located at the arcade video game and accessible to the user, for connecting the storage means to the control unit of the arcade video game.

10. The system of claim 9, wherein the storage means is selected from a group consisting of a memory card, a memory cartridge, a floppy disk, and a hard disk.

11. The system of claim 9, wherein the storage means receives the user-defined instructions from the control unit of the home video game when the storage means is connected to the first connector means, and wherein the storage means delivers the user-defined instructions to the control unit of the arcade video game when the storage means is connected to the second connector means.

12. The system of claim 9, wherein the storage means receives the user-defined instructions from the control unit of the arcade video game when the storage means is connected to the second connector means, and wherein the storage means delivers the user-defined instructions to the control unit of the home video game when the storage means is connected to the first connector means.

13. The system of claim 9, wherein when the storage means is connected to the second connector means, the user controller of the arcade video game is operated by the user to cause the control unit of the arcade video game to execute the user-defined instructions during play of the arcade video game.

14. The system of claim 9, wherein the arcade video game includes a cabinet containing the associated control unit and the associated display and supporting the associated user controller, the second connector means being mounted to a side of the cabinet.

15. The system of claim 9, wherein the first connector means allows the control unit of the home video game to execute the user-defined instructions when the storage means is connected to the first connector means, and wherein the second connector means allows the control unit of the arcade video game to execute the user-defined instructions when the storage means is connected to the second connector means.

16. The system of claim 9, wherein the user-defined instructions direct positioning and movement of video characters appearing in the home and arcade video games.

17. The system of claim 9, wherein the home and arcade video games are a sports game, the user-defined instructions including a sports play directing positioning and movement of video sports players.

18. The system of claim 17, wherein the sports play is a football play and the video sports players are video football players, the user-defined football play defining a formation and starting positions of the video football players prior to a snap of a video football, the user-defined football play defining routes run by the video football players out of the formation after the video football is snapped.

19. A system for transferring user-defined instructions between a home video game and a corresponding arcade video game, a game program of one of the home and arcade video games providing a setup mode and a play mode, the video game being played during the play mode but not during the setup mode, the system comprising:

means, included in one of the home and arcade video games, for allowing a user to create the user-defined instructions during the setup mode prior to playing the game;

portable storage means for storing the user-defined instructions;

first connector means, located at the home video game and accessible to the user, for connecting the storage means to the home video game;

second connector means, located at the arcade video game and accessible to the user, for connecting the storage means to the arcade video game;

said first and second connector means accessing said user-defined instructions for transfer to the random access memory of said home video game and said arcade video game, respectively.

20. The system of claim 19, further including means, included in the one of the home and arcade video games, for loading the user-defined instructions from the one of the home and arcade video games into the storage means.

21. The system of claim 20, further including means, included in the other of the home and arcade video games, for loading the user-defined instructions from the storage means into the other of the home and arcade video games.

22. The system of claim 21, further including means, included in the other of the home and arcade video games, for executing the user-defined instructions loaded therein.

23. A method for transferring user-defined instructions between a home video game and a corresponding arcade video game, the home video game and the arcade video game each including a control unit, a user controller, random access memory, and a display, the user controller and the display being connected to the control unit, the control unit executing a game program to create a visual representation on the display, the game program of one of the home and arcade video games providing a setup mode and a play mode, the video game being played during the play mode but not during the setup mode, the user controller being operated by a user to cause the control unit to vary the visual representation on the display, the method comprising:

connecting a portable memory device to the control unit of one of the home and arcade video games;

operating the user controller of the one of the home and arcade video games to create the user-defined instructions during the setup mode prior to playing the game and to cause the associated control unit to load the user-defined instructions into the memory device; and connecting the memory device to the other of the home and arcade video games to allow the user-defined instructions to enter the random access memory of the other of the home and arcade video games.

24. The method of claim 23, further including the step of operating the user controller of the other of the home and arcade video games to cause the associated control unit to load the user-defined instructions from the memory device into the associated control unit, thereby allowing the associated control unit to execute the user-defined instructions during game play.

25. The method of claim 24, further including the step of operating the user controller of the other of the home and arcade video games to cause the associated control unit to execute the user-defined instructions during play of the other of the home and arcade video games.

26. The method of claim 23, wherein the user-defined instructions direct positioning and movement of video characters appearing in the home and arcade video games.

27. The method of claim 23, wherein the home and arcade video games are a sports game, the user-defined instructions including a sports play directing positioning and movement of video sports players.

28. The method of claim 27, wherein the sports play is a football play and the video sports players are video football players, the user-defined football play defining a formation and starting positions of the video football players prior to a snap of a video football, the user-defined football play defining routes run by the video football players out of the formation after the video football is snapped.

29. The method of claim 23, further including the step of loading the user-defined instructions from the memory device into the control unit of the other of the home and arcade video games.

30. The method of claim 29, further including the step of executing the user-defined instructions loaded into the control unit of the other of the home and arcade video games.

31. A method for transferring user-defined instructions between a home video game and a corresponding arcade video game, a game program of one of the home and arcade video games providing a setup mode and a play mode, the video game being played during the play mode but not during the setup mode, the method comprising:

creating the user-defined instructions daring the setup mode prior to playing the game on one of the home and arcade video games;

connecting a portable memory device to the one of the home and arcade video games;

storing the user-defined instructions in the memory device;

disconnecting the memory device from the one of the home and arcade video games; and connecting the memory device to the other of the home and arcade video games to allow the user-defined instructions to enter the random access memory of the other of the home and arcade video games.

32. The method of claim 31, wherein the user-defined instructions direct positioning and movement of video characters appearing in the home and arcade video games.

33. The method of claim 31, wherein the home and arcade video games are a sports game, the user-defined instructions including a sports play directing positioning and movement of video sports players.

34. The method of claim 33, wherein the sports play is a football play and the video sports players are video football players, the user-defined football play defining a formation and starting positions of the video football players prior to a snap of a video football, the user-defined football play defining routes run by the video football players out of the formation after the video football is snapped.

35. The method of claim 31, further including the step of loading the user-defined instructions from the memory device into the other of the home and arcade video games.

36. The method of claim 35, further including the step of executing the user-defined instructions loaded into the other of the home and arcade video games.

37. An arcade video game, comprising:

a control unit, a user controller, random access memory, and a display, the user controller and the display being connected to the control unit, the control unit executing a game program to create a visual representation on the display, the user controller being operated by a user to cause the control unit to vary the visual representation on the display; and a reading device accessible to the user and adapted to receive a portable memory device containing user-defined instructions loaded into the memory device by the user at a home video game corresponding to the arcade video game, the user-defined instructions being created by the user during a setup mode of the home video game prior to playing the game, the setup mode occurring outside of play of the home video game, the reading device being connected to the control unit such that the control unit can access the user-defined instructions, insert the user-defined instructions into said random access memory, and execute the user-defined instructions during play of the arcade video game.

38. The arcade video game of claim 37, further including a cabinet containing the control unit and the display and supporting the user controller, the reading device being mounted to a side of the cabinet.

39. The arcade video game of claim 37, wherein the user-defined instructions direct positioning and movement of video characters appearing on the display of the arcade video game.

40. The arcade video game of claim 37, wherein the arcade video game and the corresponding home video game are a sports game, the user-defined instructions including a sports play directing positioning and movement of video sports players.

41. The arcade video game of claim 40, wherein the sports play is a football play and the video sports players are video football players, the user-defined football play defining a formation and starting positions of the video football players prior to a snap of a video football, the user-defined football play defining routes run by the video football players out of the formation after the video football is snapped.

* * * * *

UNITED STATES PATENT AND TRADEMARK OFFICE
CERTIFICATE OF CORRECTION

PATENT NO. : 6,406,372 B1 Page 1 of 1
DATED : June 18, 2002
INVENTOR(S) : Turmell et al.

It is certified that error appears in the above-identified patent and that said Letters Patent is hereby corrected as shown below:

<u>Column 9,</u>
Line 17, delete "borne" and insert -- home --

<u>Column 11,</u>
Line 49, delete "daring" and insert -- during --

Signed and Sealed this

Third day of September, 2002

Attest:

JAMES E. ROGAN
Attesting Officer     *Director of the United States Patent and Trademark Office*